United States Patent
Kuroda et al.

(10) Patent No.: US 6,876,111 B2
(45) Date of Patent: Apr. 5, 2005

(54) BEARING STRUCTURE HAVING A RESIN CASE WITH AXIAL SLIT

(75) Inventors: Motokazu Kuroda, Tokyo (JP); Miyuki Takatsuki, Tokyo (JP); Kyoko Higashino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/777,679

(22) Filed: Feb. 13, 2004

(65) Prior Publication Data

US 2004/0160138 A1 Aug. 19, 2004

(30) Foreign Application Priority Data

Feb. 18, 2003 (JP) .................................. 2003-039833

(51) Int. Cl.⁷ ............................ H02K 5/16; F16C 17/10
(52) U.S. Cl. ................................... 310/90; 384/235
(58) Field of Search .......................... 310/91, 67 R, 310/90, 214, 89, 254, 258; 384/535, 537, 504, 226; 360/98.07, 99.04

(56) References Cited

U.S. PATENT DOCUMENTS

| | | | | |
|---|---|---|---|---|
| 3,097,895 A | * | 7/1963 | Matt ........................... | 384/535 |
| 3,397,332 A | * | 8/1968 | Pitner .......................... | 310/90 |
| 3,503,121 A | * | 3/1970 | Howe, Jr. .................... | 29/527.2 |
| 3,557,421 A | * | 1/1971 | Howe, Jr. .................... | 29/898.07 |
| 3,679,279 A | * | 7/1972 | Van Dorn et al. ........... | 384/537 |
| 4,142,618 A | * | 3/1979 | Fontaine et al. ............. | 192/98 |
| 4,261,625 A | * | 4/1981 | Renaud ....................... | 384/624 |
| 4,546,280 A | * | 10/1985 | Pfluger ....................... | 310/68 D |
| 4,618,793 A | * | 10/1986 | Shizuka et al. ............. | 310/232 |
| 5,069,323 A | * | 12/1991 | Takeuchi et al. ........ | 192/110 B |
| 5,405,199 A | * | 4/1995 | Mabuchi et al. ............. | 384/204 |
| 5,527,115 A | * | 6/1996 | Zepp et al. .................. | 384/537 |
| 5,650,678 A | * | 7/1997 | Yokozawa et al. ........... | 310/90 |
| 6,322,254 B1 | * | 11/2001 | Schwinghammer et al. | 384/537 |
| 6,648,514 B2 | * | 11/2003 | Cevasco et al. ............. | 384/281 |
| 6,705,763 B2 | * | 3/2004 | Kamura et al. ............. | 384/544 |
| 6,750,587 B2 | * | 6/2004 | York et al. .................. | 310/263 |
| 2003/0063826 A1 | * | 4/2003 | Cevasco et al. ............. | 384/537 |
| 2004/0076353 A1 | * | 4/2004 | Kubota et al. .............. | 384/276 |

FOREIGN PATENT DOCUMENTS

| | | | | |
|---|---|---|---|---|
| DE | 3933119 | * | 4/1991 | .......... F16C/35/06 |
| JP | 53048148 | * | 5/1978 | .......... F16C/27/00 |
| JP | 09-149603 A | | 6/1997 | |
| JP | 2002-125346 A | | 4/2002 | |

* cited by examiner

*Primary Examiner*—Darren Schuberg
*Assistant Examiner*—Heba Elkassabgi
(74) *Attorney, Agent, or Firm*—Sughrue Mion, PLLC

(57) ABSTRACT

A dynamoelectric machine can achieve cost reduction by omitting the formation of grooves on an outer peripheral surface of an outer ring (26) of a bearing (7), and it can also prevent creeping of the bearing (7), thereby suppressing damage to a bearing housing (2a). A resin case (30) is formed in the shape of a cylinder so as to cover the entire axial length of the outer ring (26) of the counter-driving side bearing (7), and slits (32) are formed in the resin case (30) so as to extend axially from one axial end thereof to the other axial end thereof. The resin case (30) is press-fitted into the counter-driving side bearing housing (2a) with the one axial end of the resin case (30) being located at an opening side of the counter-driving side bearing housing (2a). The counter-driving side bearing (7) is press-fitted into the resin case (30).

4 Claims, 4 Drawing Sheets

BEARING STRUCTURE HAVING A RESIN CASE WITH AXIAL SLIT

BACKGROUND OF THE INVENTION

1. Field of the Invention

The present invention relates to a dynamoelectric machine such as an alternator installed on a vehicle, and more particularly, it relates to a structure in which a bearing arranged at each shaft end of a rotor is received in a bearing housing of a bracket.

2. Description of the Related Art

In a known vehicular alternator, a bearing arranged at one end of a shaft of a rotor is received in a bearing housing arranged in a rear bracket, and the rotor is rotatably supported at one shaft end thereof by the rear bracket through the bearing. The bearing is constructed with rolling members being interposed between an outer ring and an inner ring, and the one end of the shaft of the rotor is press-fitted into the inner ring so as to be integrated with the inner ring, and the outer ring is fixedly supported by the bearing housing, whereby the rotor is able to rotate relative to the bearing housing through the bearing. In addition, a plurality of rows of annular grooves are formed on the outer peripheral surface of the outer ring in an axially spaced apart relation with respect to one another with resin bands being fitted into the annular grooves, respectively. Since the resin bands have a coefficient of linear thermal expansion higher than that of the rear bracket (e.g., made of aluminum) and higher than that of the outer ring (e.g., made of iron), the thermal expansion of each resin band due to the generation of heat thereof during operation of the vehicular alternator is greater than the thermal expansion of the bearing housing. As a result, reduction in the coupling or binding force between the bearing housing and the bearing due to a difference in their thermal expansions resulting from the heat generation during operation of the vehicular alternator is suppressed by the thermal expansion of the resin bands, thereby preventing the generation of creep (idling) of the alternator (for instance, see a first patent document: Japanese patent application laid-open No.2002-125346 (particularly FIG. 6 and paragraph Nos. 0029 and 0031).

With the known vehicular alternator, it is necessary to form the annular grooves on the outer peripheral surface of the outer ring so as to arrange therein the resin bands for the purpose of creep prevention. Therefore, the manufacturing cost of the bearing becomes high, giving rise to a problem against the cost reduction of the vehicular alternator.

Moreover, the resin bands are arranged not in the whole range extending axially of the bearing but in a partial area alone, and hence there arises another problem. That is, when an excessive load is applied to the bearing, it is impossible to suppress the generation of creeping of the bearing, so there might be the danger that the bearing housing is subjected to wear and damage.

SUMMARY OF THE INVENTION

The present invention is intended to obviate the problems as referred to above, and has for its object to provide a dynamoelectric machine in which a bearing is press-fitted into a bearing housing through the interposition of a cylindrical resin casing formed to cover the entire axial length of the bearing, thereby making it possible to achieve cost reduction with the omission of groove machining on the outer peripheral surface of an outer ring of the bearing as well as to prevent the creeping of the bearing for suppression of damage to the bearing housing.

Bearing the above object in mind, the present invention resides in a dynamoelectric machine which is constructed as follows. A pair of brackets each having a bearing housing of a bottomed cylindrical configuration are arranged with their openings directed inwardly. A pair of bearings each having a cylindrical outer ring and a cylindrical inner ring with rolling members interposed therebetween are received in the bearing housings, respectively, with the rotation of the outer rings being restricted. A rotor having a shaft rotatably is supported by the brackets through the bearings, with the shaft being press-fitted at opposite ends thereof into the inner rings. A resin case is interposed between one of the bearing housings and an associated one of the outer rings of the bearings. The resin case is formed in the shape of a cylinder so as to cover the entire axial length of the associated outer ring, the resin case having a slit formed therein so as to extend in an axial direction from one axial end of the resin case to the other axial end thereof. The resin case is press-fitted into the associated bearing housing with the one axial end thereof being positioned at an opening side of the associated bearing housing, one of the bearings being press-fitted into the resin case.

With the above arrangement, cost reduction can be achieved by omitting the formation of grooves on the outer peripheral surface of the outer ring of the bearing, and creeping of the bearing can be prevented, thereby making it possible to suppress damage to the bearing housing.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1.

Figure 1:
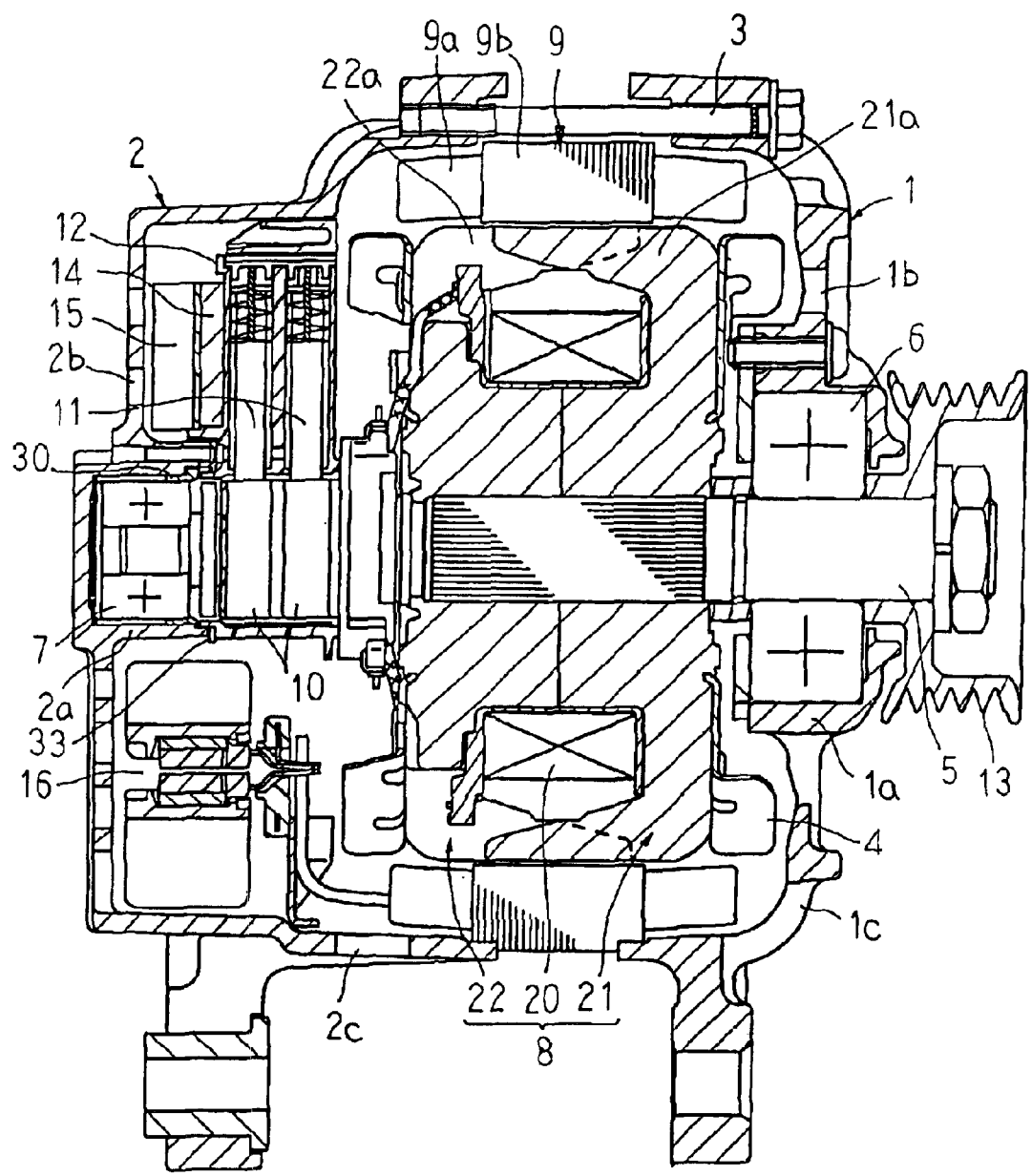
FIG. 1 is a vertical cross sectional view showing a vehicular alternator according to a first embodiment of the present invention.
Figure 2:
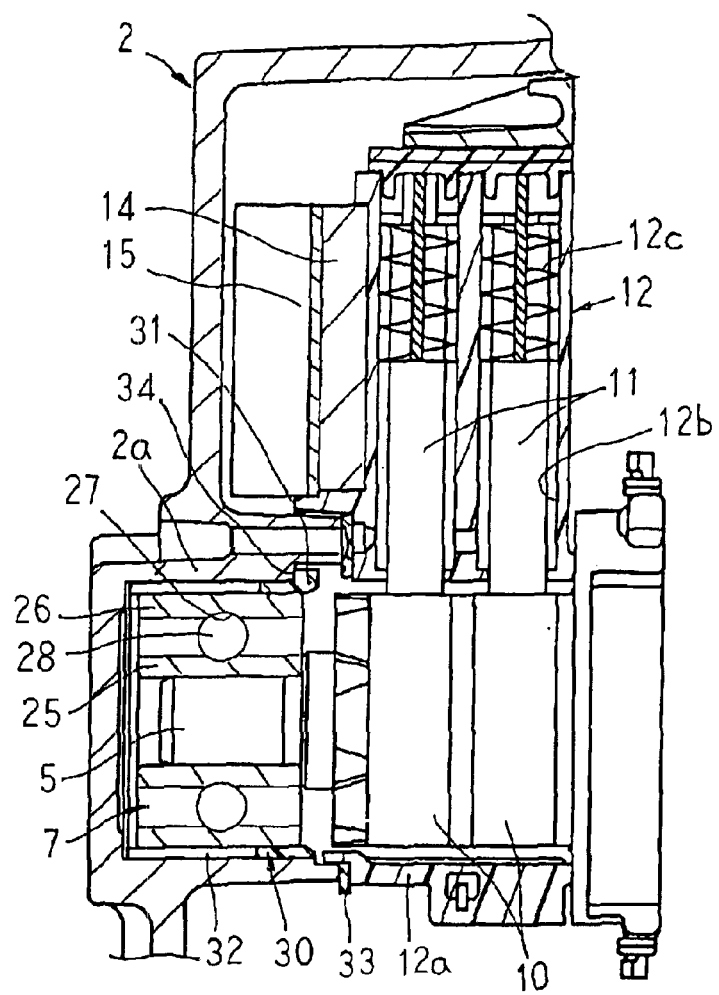
FIG. 2 is a cross sectional view of essential portions of the vehicular alternator according to the first embodiment of the present invention, showing the surroundings of a bearing housing.
Figure 3:
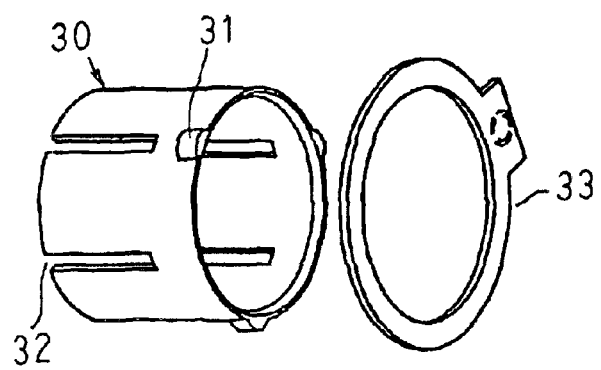
FIG. 3 is a perspective view showing a resin casing and a rubber packing in the vehicular alternator according to the first embodiment of the present invention.

FIG. 1 is a vertical cross sectional view that shows a dynamoelectric machine in the form of a vehicular alternator constructed in accordance with a first embodiment of the present invention. FIG. 2 is a cross sectional view of essential portions of the vehicular alternator according to the first embodiment of the present invention, showing the surroundings of a bearing housing. FIG. 3 is a perspective view that shows a resin casing and a rubber packing in the vehicular alternator according to the first embodiment of the present invention.

In FIG. 1, a driving side bracket 1 and a counter-driving side bracket 2, which are made of aluminum and each molded into a bowl-shaped configuration, are coupled with each other into an integral unit by means of fastening bolts 3 with a bowl-shaped opening of the driving side bracket 1 being arranged in opposition to a bowl-shaped opening of the counter-driving side bracket 2. A driving side bearing housing 1a and a counter-driving side bearing housing 2a both of a bottomed cylindrical configuration are formed integrally with central portions of opposed end faces of the driving side bracket 1 and the counter-driving side bracket 2, respectively, with their openings being directed inwardly. In addition, vent holes 1b, 2b are formed through the outer peripheral portions of the bearing housings 1a, 2a of the driving side bracket 1 and the counter-driving side bracket 2, respectively. Also, vent holes 1c, 2c are formed through the side surface edge portions of the driving side bracket 1 and the counter-driving side bracket 2, respectively.

A shaft 5 is rotatably supported by the driving side bracket 1 and the counter-driving side bracket 2 through a driving side bearing 6 and a counter-driving side bearing 7 which are arranged in the driving side bearing housing 1a and the counter-driving side bearing housing 2a, respectively. A Lundell-type rotor 8 is fixedly secured to the shaft 5 and it is arranged in the driving side bracket 1 and the counter-driving side bracket 2 for rotation relative thereto. A stator 9 is arranged to cover or surround the rotor 8 with opposite ends of a stator core 9b being supported by the driving side bracket 1 and the counter-driving side bracket 2, respectively.

Slip rings 10 for supplying a field current to a field winding 20 of the rotor 8 are fixedly attached to a counter-driving side portion of the shaft 5. A brush holder 12 has an annular portion 12a through which the shaft 5 is inserted, and a pair of brush insertion holes 12b with their longitudinal directions perpendicularly intersecting the central axis of the annular portion 12a are arranged in parallel with each other in the axial direction of the annular portion 12a. Brushes 11 are arranged in the counter-driving side bracket 2 in such a manner that they are received in the brush insertion holes 12b, respectively, for movement into and out of the annular portion 12a. The shaft 5 is inserted in the annular portion 12a, and the brushes 11 are placed in sliding contact with the corresponding slip rings 10, respectively, under the action of the urging forces of corresponding springs 12c.

A pulley 13 is fixedly attached to the driving side end portion of the shaft 5 so that the rotating torque of the engine can be transmitted to the shaft 5 through a belt (not shown) wrapped around the pulley 13 and an unillustrated driving pulley operatively coupled with an unillustrated crankshaft of the engine.

A voltage regulator 14 for adjusting the magnitude of an AC voltage generated in the stator 9 is bonded to a heat sink 15 fitted into the brush holder 12. A commutator 16 is electrically connected with the stator 9 for commutating an alternating current generated in the stator 9 into a direct current. The commutator 16 is installed in the counter-driving side bracket 2.

The rotor 8 is provided with the field winding 20 through which an electric current flows to generate a magnetic flux, and a pair of field cores 21, 22 arranged to enclose the field winding 20 for forming magnetic poles with the magnetic flux generated by the field winding 20. The pair of field cores 21, 22 are made of iron, and are each provided on their outer peripheral portion with a plurality of hook-shaped magnetic poles 21a, 22a protruded at an equiangular pitch in a circumferential direction thereof The pair of field cores 21, 22 are fixedly attached to the shaft 5 in an opposed relation with each other with the hook-shaped magnetic poles 21a, 22a being in mesh with one another, and the field winding 20 is fitted to the pair of field cores 21, 22 to construct the rotor 8. A pair of driving side and counter-driving side fans 4 are attached to the opposite axial ends of the rotor 8, respectively.

The counter-driving side bearing 7 includes a pair of cylindrical inner ring 25 and cylindrical outer ring 26 made of carbon steel, as shown in FIG. 2. A ball track 27 is provided between the inner ring 25 and the outer ring 26, and a plurality of rolling members in the form of balls 28 are arranged on the ball track 27.

A resin case 30 is made of a resin material such as, for example, a polyphenylene sulfide (PPS) resin, and takes the shape of a cylinder with a wall thickness of about 1 mm so as to cover the entire axial length of the counter-driving side bearing 7, as shown in FIG. 3. The resin case 30 is provided on its outer periphery at one end thereof with three detents 31, which are arranged at an equiangular pitch in the circumferential direction and each protrude in a radially outer direction. Also, the resin case 30 is formed with six axial slits 32, which are arranged at an equiangular pitch in the circumferential direction and each extend from one axial end of the resin case 30 to the other axial end thereof Here, it is to be noted that each slit 32 is formed to have a width narrower than the circumferential width of each detent 31, and three of the slits 32 are each formed to extend from the root side of a corresponding detent 31 at the one end of the resin case 30 to the other end thereof.

A rubber packing 33 is formed in the shape of a ring along the edge portion of an opening of the counter-driving side bearing housing 2a by using a rubber material such as, for example, ethylene-propylene-diene terpolymer (EPDM), as shown in FIG. 3.

Now, reference will be made to the mounting structure of the shaft 5 to the counter-driving side bearing housing 2a while referring to FIG. 2.

First of all, the resin case 30 is press-fitted into the counter-driving side bearing housing 2a with the detents 31 being located at the opening side thereof, and the rubber packing 33 is arranged at the edge portion of the opening of the counter-driving side bearing housing 2a. Then, the brush holder 12 is fixedly attached to the counter-driving side bracket 2. As a result, the rubber packing 33 is elastically held between the edge portion of the opening of the counter-driving side bearing housing 2a and the annular portion 12a of the brush holder 12.

Subsequently, the counter-driving side bearing 7 is press-fitted into the resin case 30, and the shaft 5 is press-fitted into the counter-driving side bearing 7, whereby the resin case 30 between the counter-driving side bearing housing 2a and the outer ring 26 is caused to elastically deform, thus generating a binding or coupling force between the counter-driving side bearing housing 2a and the outer ring 26 through the resin case 30. As a consequence, the outer ring 26 is fixedly attached to the counter-driving side bearing housing 2a, and one end of the shaft 5 is press-fitted into the counter-driving side bearing 7. Thus, the end portion of the shaft 5 is fixedly attached to the inner ring 25, and the outer ring 26 is also fixedly attached to the counter-driving side bearing housing 2a through the resin case 30, whereby the rotor 8 is rotatably supported by the counter-driving side bearing housing 2a.

Here, note that three detent receiving portions 34 are recessed in the edge portion of the opening of the counter-driving side bearing housing 2a at locations corresponding to the detents 31, and axially extending vent grooves (not shown) are also formed in the inner wall surface of the counter-driving side bearing housing 2a so as to provide fluid communication between the slits 32 and the detent receiving portions 34.

Thus, when the resin case 30 is press-fitted into the counter-driving side bearing housing 2a, the detents 31 are placed into engagement with the detent receiving portions 34, whereby the resin casing 30 is positioned in place and the rotation of the resin case 30 is restricted. In addition, upon press-fitting of the counter-driving side bearing 7, air in the counter-driving side bearing housing 2a is discharged to the outside through the slits 32 and the vent grooves.

With the vehicular alternator as constructed above, an electric current is supplied from a battery (not shown) to the field winding 20 of the rotor 8 through the brushes 11 and the slip rings 10, thereby generating a magnetic flux. As a result, the hook-shaped magnetic poles 21a of the field core 21 are magnetized into S poles, and the hook-shaped magnetic poles 22a of the field core 22 are magnetized into N poles under the action of the magnetic flux. On the other hand, the rotating torque of the engine is transmitted to the shaft 5 through the belt (not shown) and the pulley 13, whereby the rotor 8 is caused to rotate. Thus, a rotating field is given to the stator winding 9a, so that an electromotive force is generated in the stator winding 9a. The alternating-current electromotive force thus generated is commutated into a direct current through the commutator 16, and the output voltage of the commutator 16 is regulated by the voltage regulator 14, so that the battery is thereby charged.

At the driving side, the driving side fan 4 is driven to rotate in accordance with the rotation of the shaft 5 so that outside air is introduced from the vent hole 1b into the driving side bracket 1, turned into a centrifugal direction by means of the driving side fan 4 to cool one coil end of the stator winding 9a, and thereafter discharged to the outside from the vent hole 1c.

On the other hand, at the counter-driving side, the counter-driving side fan 4 is driven to rotate in accordance with the rotation of the shaft 5, whereby outside air is introduced from the vent hole 2b into the counter-driving side bracket 2, where it flows toward the rotor 8 side while cooling the commutator 16 and the voltage regulator 14, then is turned into a centrifugal direction by means of the counter-driving side fan 4, and discharged to the outside from the vent hole 2c after cooling the other coil end of the stator winding 9a.

Here, note that the counter-driving side bearing 7 is fitted in the counter-driving side bracket 2 in which heat-generating parts such as the commutator 16 and the voltage regulator 14 are arranged. Thus, the heat generated by the heat-generating parts is transmitted to the counter-driving side bearing 7 through the counter-driving side bearing housing 2a, whereby the counter-driving side bearing housing 2a, the resin case 30 and the counter-driving side bearing 7 are subjected to thermal expansion under the action of the heat thus transmitted. At this time, since the counter-driving side bearing housing 2a is made of aluminum and the counter-driving side bearing 7 is made of carbon steel, the counter-driving side bearing housing 2a and the counter-driving side bearing 7 thermally expand in such a manner as to increase the clearance between the counter-driving side bearing housing 2a and the outer ring 26. On the other hand, the resin case 30 having a large coefficient of linear thermal expansion thermally expands so as to supplement the increase of the clearance between the counter-driving side bearing housing 2a and the outer ring 26, as a consequence of which a sufficient binding or coupling force between the counter-driving side bearing housing 2a and the outer ring 26 through the resin case 30 is obtained, thus making it possible to suppress the generation of creeping.

In this manner, according to this first embodiment, the counter-driving side bearing 7 is press-fitted into the counter-driving side bearing housing 2a through the resin case 30, and hence the reduction of the binding or coupling force resulting from a difference in thermal expansion between the counter-driving side bearing housing 2a and the counter-driving side bearing 7 can be suppressed by the thermal expansion of the resin case 30. As a result, the generation of creeping is prevented, thus making it possible to suppress damage to the counter-driving side bearing housing 2a.

In addition, the resin case 30 is formed in a cylindrical shape to cover the entire length of the counter-driving side bearing 7, and hence, even if an excessive load acts on the counter-driving side bearing 7, the creeping of the counter-driving side bearing 7 is inhibited. Moreover, since there is no need to form any annular groove on the outer peripheral surface of the outer ring 26, the manufacturing cost of the bearing can be reduced. Further, since heat conduction from the counter-driving side bearing housing 2a to the counter-driving side bearing 7 is interrupted by the resin case 30, the effective life of the counter-driving side bearing 7 can be prolonged.

Moreover, the resin case 30 is provided with the slits 32, so that dimensional errors of the resin case 30 can be absorbed by the slits 32. As a result, it becomes easy to press fit the resin case 30 into the counter-driving side bearing housing 2a. In addition, the mechanical deformation of the resin case 30 upon press-fitting thereof and the thermal deformation of the resin case 30 during thermal expansion thereof can be absorbed by the slits 32, and hence it is possible to suppress the generation of damage to the resin case 30.

Furthermore, each of the slits 32 has a width narrower than the circumferential width of each detent 31, and is formed so as to extend from the root side of each detent 31 at one end of the cylindrical resin case 30 to the other or anti-detent side end thereof. Thus, even if the slits 32 are formed in the resin case 30 over almost the entire axial length thereof, it is possible to ensure sufficient strength of the resin case 30.

Besides, the detents 31 are provided on the resin case 30, and the detent receiving portions 34 are formed in the edge portion of the opening of the counter-driving side bearing housing 2a. Consequently, the resin case 30 can be press-fitted into the counter-driving side bearing housing 2a while being positioned in place in a simple and easy manner.

In addition, since the resin case 30 is made of a wear-resistant PPS resin having elasticity close to that of hard rubber, upon press-fitting of the counter-driving side bearing 7, the resin case 30 is caused to elastically deform, whereby a sufficient binding force is ensured between the counter-driving side bearing housing 2a and the counter-driving side bearing 7, thus making it possible to prolong the life of the counter-driving side bearing 7.

Moreover, since the rubber packing 33 is elastically held between the edge portion of the opening of the counter-driving side bearing housing 2a and the annular portion 12a of the brush holder 12, the entrance of water, foreign matter or the like into the counter-driving side bearing housing 2a can be prevented.

Here, it is to be noted that though not described concretely in the above-mentioned first embodiment, the driving side bearing 6 is fitted into the driving side bracket 1 in which there is arranged no heat-generating part. Therefore, an enough free space is provided in the surroundings of the driving side bearing housing 1a. Thus, in general, the problem of fatigue failure of the driving side bearing 6 can be obviated by adopting a bearing of high strength with an increased outside diameter or with its outer ring being increased in thickness. Also, the problem of creeping of the driving side bearing 6 resulting from the heat of heat-generating parts can hardly occur, and hence anti-creep measures such as resin bands or the like need not generally be taken for the driving side bearing 6. However, for example, in cases where heat-generating parts are arranged in the surroundings of the driving side bearing housing 1a, at the driving side, too, the driving side bearing 6 is press-fitted into the driving side bearing housing 1a through a resin case 30, as at the counter-driving side.

In addition, although in the above-mentioned first embodiment the three detents 31 are formed on the resin case 30 at an equiangular pitch in the circumferential direction thereof, the number of the detents 31 is not limited to three but may be any. That is, at least one detent may be good for the purpose of preventing the rotation of the resin case 30 relative to the counter-driving side bearing housing 2a. Similarly, the number of the slits 32 is not limited to 6 but any number of slits including at least one slit may be good.

Embodiment 2.

Figure 4:
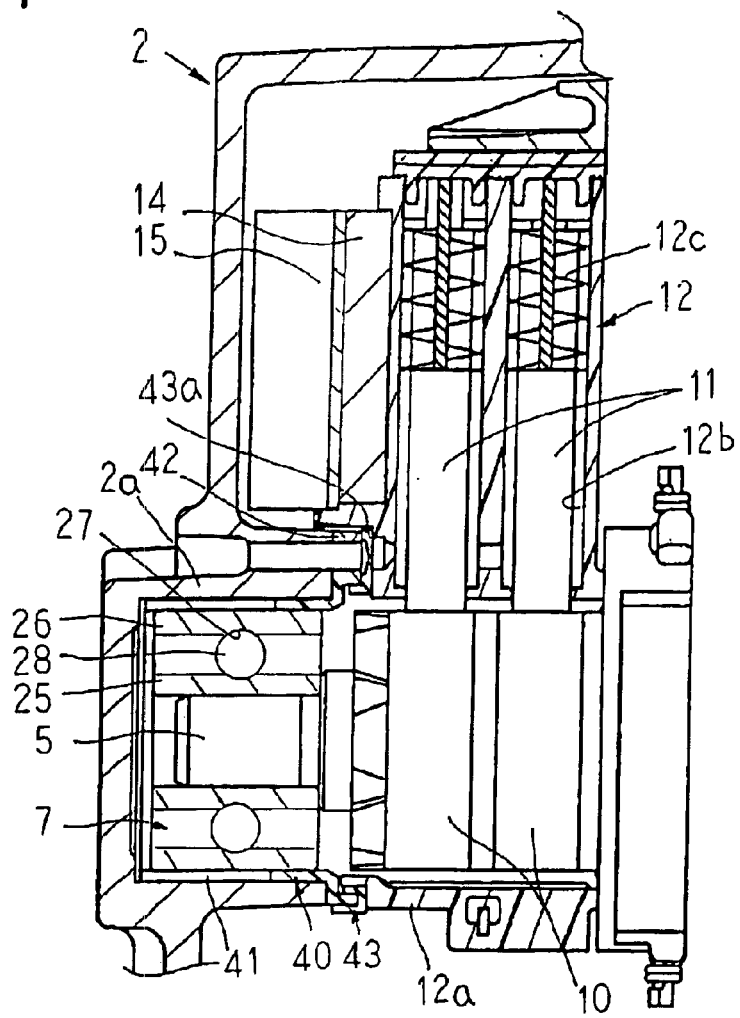
FIG. 4 is a cross sectional view of essential portions of a vehicular alternator according to a second embodiment of the present invention, showing the surroundings of a bearing housing.
Figure 5:
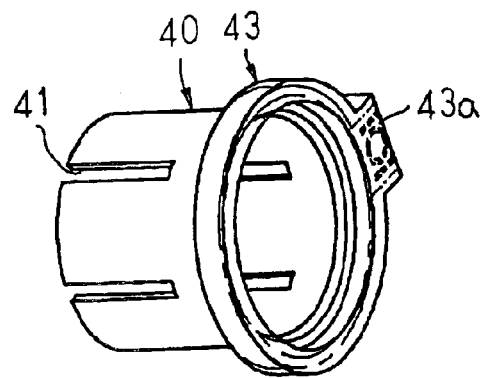
FIG. 5 is a perspective view showing a resin casing and a rubber packing in the vehicular alternator according to the second embodiment of the present invention.

FIG. 4 is a cross sectional view of essential portions of a vehicular alternator according to a second embodiment of the present invention, illustrating the surroundings of a bearing housing. FIG. 5 is a perspective view that shows a resin case and a rubber packing in the vehicular alternator according to the second embodiment of the present invention.

In FIG. 5, a resin case 40 is made of, a resin material such as, for example, a PPS resin, and takes the shape of a cylinder with a wall thickness of about 1 mm so as to cover the entire axial length of a counter-driving side bearing 7. The resin case 40 is formed with six axial slits 41, which are arranged at an equiangular pitch in the circumferential direction thereof and each extend from one axial end of the resin case 40 to the other axial end thereof. The resin case 40 also has a positioning portion 42 extending from its outer periphery at the one axial end thereof in a radially outside direction. A rubber packing 43 is formed in the shape of a ring along the edge portion of an opening of a counter-driving side bearing housing 2a by using a rubber material such as, for example, an elastomer material, and has a positioning portion 43a extending in a radially outer direction. The resin casing 40 and the rubber packing 43 are dichromatically injection molded, and the rubber packing 43 is molded integrally with the one axial end of the resin case 40 with the positioning portions 42, 43a being mutually arranged in coincidence with each other. Each of the slits 41 is formed so as to extend from the root portion of the rubber packing 43 at the one axial end of the resin case 40 to the other axial end thereof.

Here, note that the resin case 40 is constructed similar to the resin case 30 in the above-mentioned first embodiment except for the omission of the detents 31 and the provision of the positioning portion 42, and the rubber packing 43 is also constructed similar to the rubber packing 33 in the above-mentioned first embodiment.

In this second embodiment, the resin case 40 is press-fitted into a counter-driving side bearing housing 2a while being positioned in place through the positioning portions 42, 43a, as shown in FIG. 4, whereby the rubber packing 43 is properly arranged at the edge portion of the opening of the counter-driving side bearing housing 2a, and a brush holder 12 is then fixedly attached to a counter-driving side bracket 2. As a result, the rubber packing 43 is elastically held between the edge portion of the opening of the counter-driving side bearing housing 2a and an annular portion 12a of the brush holder 12, and at the same time the positioning portions 42, 43a are clamped between the edge portion of the opening of the counter-driving side bearing housing 2a and the annular portion 12a of the brush holder 12, so that the movement of the positioning portions 42, 43a in the circumferential direction can be restricted. Further, a counter-driving side bearing 7 is press-fitted into the resin case 40, and a shaft 5 is press-fitted into the counter-driving side bearing 7.

Thus, in the second embodiment, too, advantageous effects similar to those of the above-mentioned first embodiment can be achieved.

Moreover, in the above-mentioned first embodiment, the resin case 30 and the rubber packing 33 are constructed as mutually separate parts, and hence, in particular, the thin rubber packing 33 is poor in handleability, resulting in that falling off thereof or the like is apt to take place upon assembly. In contrast, according to the second embodiment, the resin case 40 and the rubber packing 43, which are equivalent to the resin case 30 and the rubber packing 33 in the first embodiment, are integrally molded with each other. As a result, falling off of parts or the like upon assembly can be avoided, and the number of man-hours needed for assembly can be reduced, thus decreasing the assembling and manufacturing costs. In addition, the positioning portion 42 is restricted in its circumferential movement by being held in a compressed state between the edge portion of the opening of the counter-driving side bearing housing 2a and the annular portion 12a of the brush holder 12. Accordingly, the turning or rotation of the resin case 40 is inhibited.

Embodiment 3.

Figure 6:
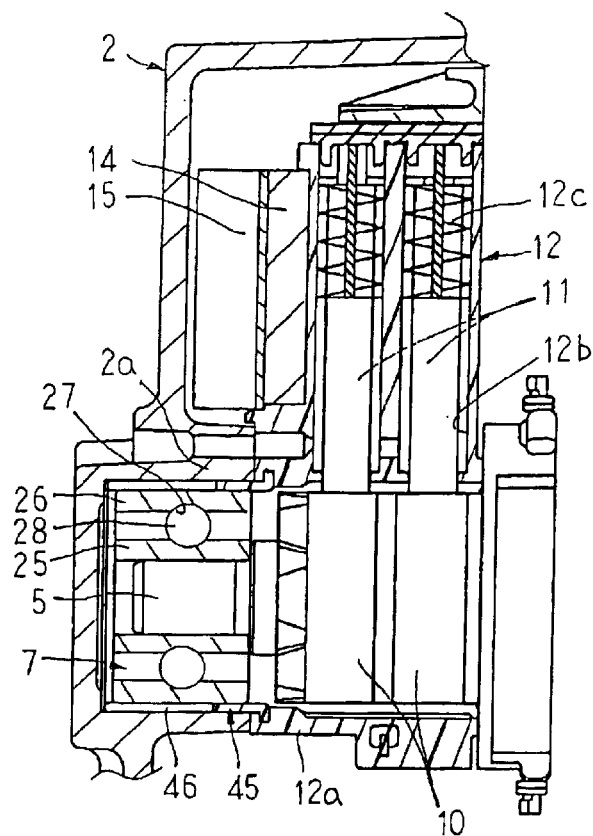
FIG. 6 is a cross sectional view of essential portions of a vehicular alternator according to a third embodiment of the present invention, showing the surroundings of a bearing housing.
Figure 7:
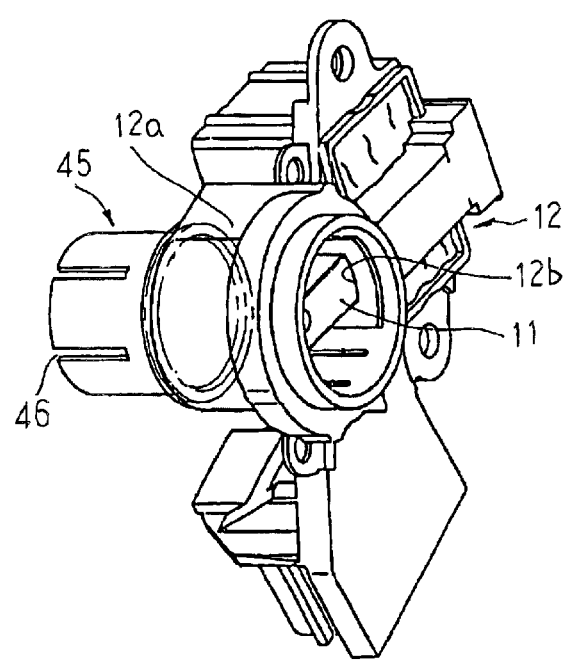
FIG. 7 is a perspective view showing a resin casing in the vehicular alternator according to the third embodiment of the present invention.

FIG. 6 is a cross sectional view of essential portions of a vehicular alternator according to a third embodiment of the present invention, illustrating the surroundings of a bearing housing. FIG. 7 is a perspective view that shows a resin casing in the vehicular alternator according to the third embodiment of the present invention.

In FIG. 7, a resin case 45 is made of a resin material such as, for example, a PPS resin, and takes the shape of a cylinder with a wall thickness of about 1 mm so as to cover the entire axial length of a counter-driving side bearing 7. The resin case 45 and a brush holder 12 are dichromatically injection molded, and the resin case 45 is integrally molded with an annular portion 12a of the brush holder 12 at a counter-driving side bearing housing side thereof. And the resin case 45 is formed with six axial slits 46, which are arranged at an equiangular pitch in the circumferential direction thereof and each extend from the root portion of the annular portion 12a at one axial end of the resin case 45 to the other axial end thereof.

Here, note that the resin case 45 is constructed similar to the resin case 30 in the above-mentioned first embodiment except for the omission of the detents 31, and the brush holder 12 is made of a PPS resin for instance.

In this third embodiment, the brush holder 12 is fitted into a counter-driving side bracket 2, as shown in FIG. 6, whereby the resin case 45 is press-fitted into a counter-driving side bearing housing 2a and an end face of the annular portion 12a is placed in abutment with the edge portion of an opening of the counter-driving side bearing housing 2a. Then, the counter-driving side bearing 7 is press-fitted into the resin case 45, and a shaft 5 is press-fitted into the counter-driving side bearing 7. Thus, in the third embodiment, too, advantageous effects similar to those of the above-mentioned first embodiment can be obtained. In this third embodiment, since the resin case 45 and the brush holder 12 are integrally molded with each other, falling off of parts or the like upon assembly can be avoided, and the number of man-hours needed for assembly can be reduced, thus decreasing the assembling and manufacturing costs.

In addition, since the brush holder 12 integrally molded with the resin case 45 is fixedly attached to the counter-driving side bracket 2, the turning or rotation of the resin case 45 is inhibited. As a result, there is no need to form detents on the resin case 45, and hence to form corresponding detent receiving portions in the counter-driving side bearing housing 2a, thus making it possible to achieve cost reduction accordingly.

Moreover, the annular portion 12a of the brush holder 12 integrally molded with the resin case 45 is in abutment with the edge portion of the opening of the counter-driving side bearing housing 2a, whereby the annular portion 12a has the function of preventing pour water to the counter-driving side bearing 7, thus making it unnecessary to employ a rubber packing. Consequently, further cost reduction can be achieved.

Incidentally, although in the above-mentioned respective embodiments the vehicular alternator has been described herein, the present invention can achieve similar advantageous effects even if applied to other dynamoelectric machines such as a.c. motors, a.c. motor generators, etc.

Furthermore, although in the above-mentioned respective embodiments the resin cases are made of the PPS resin, they may be made of other elastic materials. For instance, a polybutyrene terephthalate (PBT) resin may be used for this purpose.

Besides, although in the above-mentioned respective embodiments the resin cases 30, 40 and 45 are each fitted into the counter-driving side bearing 7 of a single-row bearing structure, the bearing into which each resin case is fitted may be of a double-row bearing structure.

While the invention has been described in terms of preferred embodiments, those skilled in the art will recognize that the invention can be practiced with modifications within the spirit and scope of the appended claims.

What is claimed is:

1. A dynamoelectric machine comprising:
   a pair of brackets each having a bearing housing of a bottomed cylindrical configuration arranged with their openings directed to an inner side;
   a pair of bearings each having a cylindrical outer ring and a cylindrical inner ring with rolling members interposed therebetween, said bearings being received in said brackets, respectively, with the rotation of said outer rings being restricted;
   a rotor having a shaft rotatably supported by said brackets through said bearings, with said shaft being press-fitted at opposite ends thereof into said inner rings; and
   a resin case interposed between one of said bearing housings and an associated one of said outer rings of said bearings,
   wherein said resin case is formed in the shape of a cylinder so as to cover the entire axial length of said associated outer ring, said resin case having a slit formed therein so as to extend in an axial direction from one axial end of said resin case to the other axial end thereof; and
   wherein said resin case is press-fitted into said associated bearing housing with said one axial end thereof being positioned at an opening side of said associated bearing housing, one of said bearings being press-fitted into said resin case.

2. The dynamoelectric machine as set forth in claim 1, wherein at least one detent is protruded in a radially outer direction in at least one circumferential location on an outer periphery of said resin case at the one axial end thereof; said slit has a width narrower than the circumferential width of said detent and extends from the neighborhood of said detent in an axial direction of said resin case; and a detent receiving portion is formed in an edge portion of an opening of said bearing housing, with said detent of said resin case press-fitted into said bearing housing being in engagement with said detent receiving portion.

3. The dynamoelectric machine as set forth in claim 1, wherein a ring-shaped rubber packing is provided which is arranged along an edge portion of an opening of said bearing housing; and said rubber packing is integrally molded with the one axial end of said resin case.

4. The dynamoelectric machine as set forth in claim 1, wherein a brush holder is provided which has an annular portion surrounding said shaft, said brush holder being fixedly attached to said bracket at a location close to said bearing housing; and said resin case has its one axial end integrally formed with said annular portion.

* * * * *